US 6,706,312 B2

(12) United States Patent
Sanz Gutierrez

(10) Patent No.: US 6,706,312 B2
(45) Date of Patent: Mar. 16, 2004

(54) CONTINUOUS DIRECT ENZYMATIC PROTEIN SOLUBILIZATION PROCESS FOR INDUSTRIAL WASTE

(75) Inventor: Pedro Sanz Gutierrez, Seville (ES)

(73) Assignee: Peptonas Vegetales, S.L., Sevilla (ES)

( * ) Notice: Subject to any disclaimer, the term of this patent is extended or adjusted under 35 U.S.C. 154(b) by 238 days.

(21) Appl. No.: 09/957,396

(22) Filed: Sep. 20, 2001

(65) Prior Publication Data

US 2002/0042500 A1 Apr. 11, 2002

(30) Foreign Application Priority Data

Oct. 4, 2000 (ES) .......................................... 200002392

(51) Int. Cl.[7] .............................. A23K 1/00; A23J 3/14; A23J 3/30
(52) U.S. Cl. ........................... 426/656; 426/52; 426/53; 426/618; 426/623; 426/629; 426/630; 426/807; 426/626; 426/634; 426/635
(58) Field of Search ................................. 426/656, 618, 426/629, 630, 623, 53, 52, 807, 626, 634, 635

(56) References Cited

U.S. PATENT DOCUMENTS 5,780,439 A * 7/1998 Mendy et al. ................. 514/21
6,033,692 A * 3/2000 Chukwu ....................... 426/44
6,372,452 B1 * 4/2002 Millan Rodriguez et al. .... 435/68.1

FOREIGN PATENT DOCUMENTS

| DE | 269086 A | * | 6/1989 | ............. A23J/1/14 |
| DE | 271261 A | * | 8/1989 | ............. A23J/1/14 |
| JP | 02002392 A | * | 1/1990 | ........... C12P/21/06 |
| WO | WO 92/11771 A | * | 7/1992 | |
| WO | WO 92/15697 A | * | 9/1992 | |
| WO | WO 98/23170 A | * | 6/1998 | |

OTHER PUBLICATIONS

Parrado et al., Journal Agric. Food Chem., vol. 39, pp. 447–450, 1991.*
Parrado et al., Journal Agric. Food Chem., vol. 41, pp. 1821–1825, 1993.*
Bautista et al., J. Agric. Food Chem., vol. 44, pp. 967–971, 1996.*

* cited by examiner

Primary Examiner—Chhaya Sayala
(74) Attorney, Agent, or Firm—Ladas & Parry

(57) ABSTRACT

Continuous direct enzymatic protein solubilization process for industrial waste. The invention consists of obtaining peptones (mixture of proteins, peptides and amino acids) starting from industrial wastes of plant origin. The process is carried out in two steps. On the first step the wastes are subjected to successive washes with acidified water to wash out alkaloids (polyphenols), sugars, insoluble fibers, etc., a concentrate rich in proteins being obtained. In a continuous process said protein concentrate is next subjected to a second enzymatc hydrolysis step (25–40%) with endoproteases, the peptones being obtained which involve a degree of solubilization in the order of 60–80% of the insoluble commencement proteins.

5 Claims, 2 Drawing Sheets

CONTINUOUS DIRECT ENZYMATIC PROTEIN SOLUBILIZATION PROCESS FOR INDUSTRIAL WASTE

TECHNICAL FIELD OF THE INVENTION

The present invention relates to the technical fields of the Food Industry, the Medical-Pharmaceutical Industry and the Chemical Industry. The product resulting from the modification of the proteins of industrial organic wastes, known as peptones, will be of use in the following applications:

Human and animal nutrition

Clinical nutrition

Nitrogenated fermentation source in the Pharmaceutical Industry.

Soluble organic fertilisers

STATE OF THE ART PRIOR TO THE INVENTION

The generation of protein-rich industrial wastes is very high (only from sunflower, about one million tons in Spain). These wastes are not used at all, or are underused in the form of low added-value products.

This type of by-products constitute a reservoir of proteins with a great economic potential.

The main obstacle for their direct use is constituted, on one hand, by the presence of antinutritional substances (pigments, alkaloids), and on the other by the deficient physical properties of the proteins. One of these deficiencies is their insolubility, motivated essentially by the treatments through which these raw materials have been subjected in the industrial processes (high temperatures, treatments with organic solvents, etc).

The use of these peptones in the human and animal food industry, as well as in other types of industry, such as the pharmaceutical (as a nitrogen source for fermentation) or the chemical industry (organic fertilisers), requires the development of the appropriate processes:

a) For the elimination of undesirable substances; soluble sugars, fibres, alkaloids, etc.

b) For the extraction of protein leading to the recovery of the protein in the by-product and yielding a new product, completely proteinaceous, which is soluble under any condition (temperature, pH and in the presence of metal ions).

The solubility of the recovered proteinaceous product will permit its use in liquid products within the industrial fields mentioned above (clinical nutrition, enteral, parenteral and maintenance diets, fermentations, organic fertilisers, etc).

The solution to this problem will be the development of processes for the preparation of agro-industrial wastes for their conversion into ideal substrates with solubilised proteins.

The solubilisation of these proteins will be carried out enzymatically, using proteases, which will modify the proteins by the hydrolytic cleavage of their polypeptide chains, with the subsequent production of protein hydrolysates (peptones).

Research in the field of human nutrition is currently focused on obtaining products that can be used to control, through the diet, chronic diseases such as arteriosclerosis, cancer, AIDS, hepatic and renal failure, as well as on obtaining products for weight control and for the nutritional control of hospitalised patients [Fürst, P (1989) *Use of short chain peptides in clinical nutrition*. J. Clin. Nutr. Gastroenterol., 205–211] and in animal nutrition the aim is obtaining specific diets for livestock animals (calf, fattened pigs and suckling animals, etc).

The use of protein hydrolysates has a number of advantages:

a) The component peptides are absorbed very effectively in the digestive tract as the original protein has already undergone a prior digestion, making absorption rapid and complete (Matthews, M. D. *Protein absorption. Then and now.* Gastroenterology 73, 1267–1279; 1977).

b) At a physiological level they present a better utilisation than equivalent mixtures of free amino acids, and the osmotic pressure produced is much lower than that of the corresponding amino acid mixture.

In this context the preparation of hydrolysates is useful in the production of physiologically functional foods to cover specific needs, such as those destined to patients suffering malnutrition associated to cancer, severe burns, multiple traumatism and hepatic diseases (Keith, M. E. and Jeejeebhoy K. N. *Enteral nutrition in wasting disorders.* Curr. Opin, Gastroenterol. 15, 159–166; 1999; Fischer J. E. *Branched-chain enriched amino acid solution in patients with liver failure: An early example of nutritional pharmacology.* J. Parenter-Enteral Nutri. 14, 249S–256S.; 1990), and as nutritional support in children with acute and chronic diarrhoea or allergy to dairy proteins (Buzinco L., et al *Anaphylactic reaction to a cow's milk whey protein hydrolysate in infants with cow's milk allergy.* Ann Allergy 62, 333–335, 1989).

With respect to other similar patented processes (WO98/23170 and WO92/11771), the main difference with the process of the invention is that on those patents, the enzymatic hydrolysis is carried out on soluble protein that has been obtained via a previous chemical treatment of the waste. This previous treatment generally consists in using soda at pH 10. In the present invention the solubilisation of the proteins is carried out by means of direct enzymatic extraction without prior chemical treatment. Additionally, WO98/23170 also employs a previous extraction with alcohol, to eliminate the polyphenols present in the waste. In the present invention the polyphenols are removed by successive washing steps with acidified water. Not using soda or alcohol extraction steps implies a considerable saving in terms of equipment, installations and solvents. Additionally, water is discharged into the environment, instead of more aggressive solvents that require previous pretreatment which is more complex and costly.

In Parrado et al. (J. Agric. Food Chem. 1991), a similar process is described, but limited to degreased sunflower flour, employing a specific protease (Kerasa®). Additionally, in said article the process is carried out discontinuously in the laboratory, in batches, whereas in this invention the process is carried out continuously, industrially, employing any protease existing in the market and applying a wide range of industrial wastes of plant origin.

DETAILED DESCRIPTION OF THE INVENTION

The present invention refers to processes leading to the direct solubilisation of protein of organic industrial waste, more specifically with the production of soluble peptones from said wastes.

Organic industrial wastes on which the following invention can be applied are:

a) Degreased filter-cakes of oilseeds (sunflower, rape, soy, etc.).

b) Degreased filter-cakes of other seeds (cotton, maize, etc.).

c) Waste originating from raw materials (barley, maize, wheat, rice, etc.) used in fermentation industries (production of bioalcohol, beer, etc.).

This direct solubilisation process, which consists of two well defined stages, is described hereunder:

1) Pre-treatment of the organic industrial wastes. All these organic industrial wastes present a number of common features:

Protein composition between 20–35% of their weight.
Proteins of very low solubility due to prior industrial treatments.
Presence of unwanted substances in the final products that would condition the use of the peptones.

Among these contaminants it is worth mentioning:

Insoluble fibres, due to having a great capacity to absorb compounds such as amino acids, small peptides and proteins, which reduces the bioavailability of the latter. Likewise, being these fibres insoluble, they would alter the organoleptic properties of the peptones, preventing their use in liquid products.

Soluble sugars. Due to nutritional reasons and due to interactions with proteins.

Alkaloids. They are usually protease inhibitors, and change the organoleptic properties of the products obtained, etc.

Figure 1:
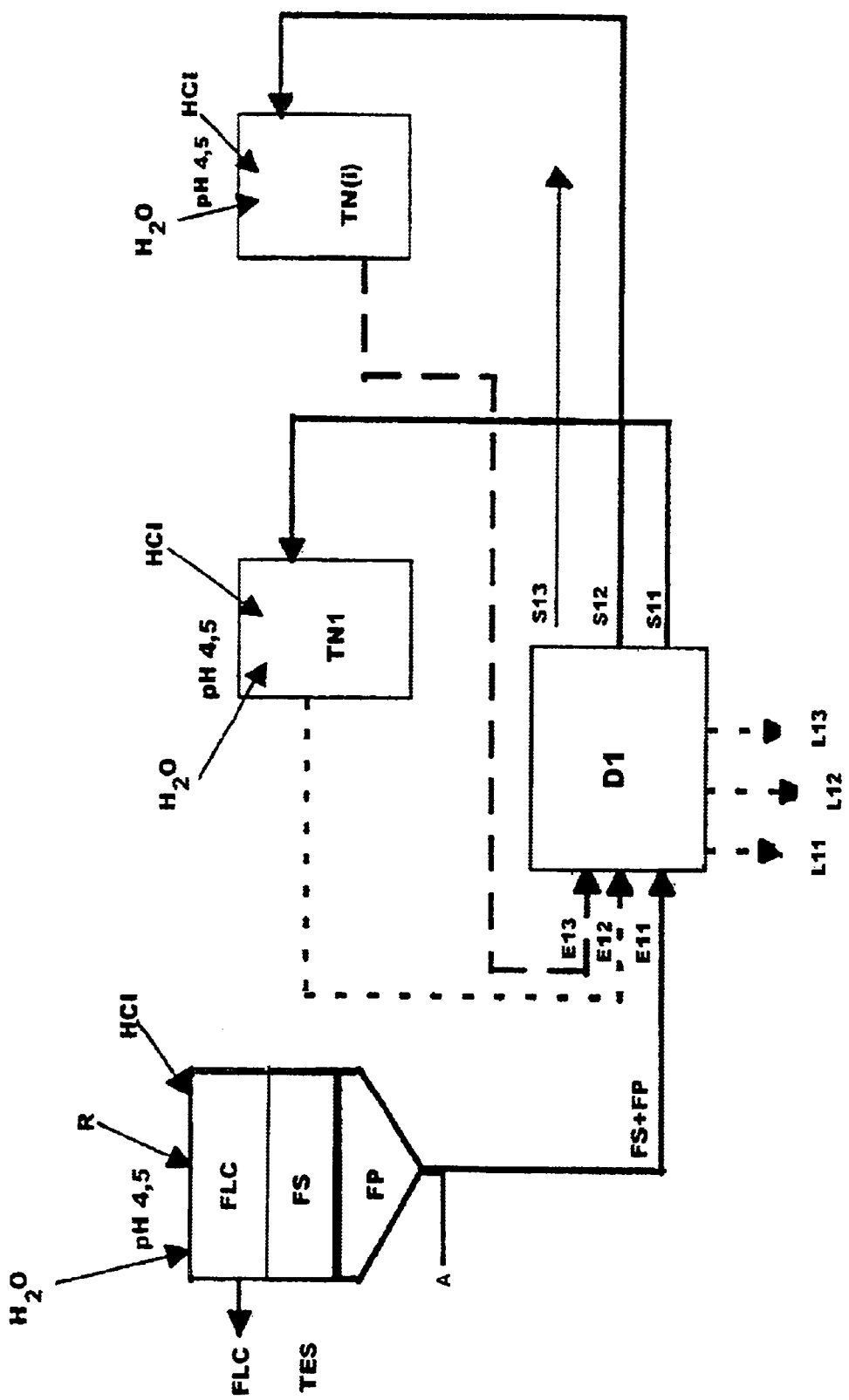
FIG. 1: Separation tank (TES) with aeration, pH control and mechanical separation of floating elements: lignocellulose fraction or low density insoluble fraction (FLO); Soluble Fraction (FS); Protein Fraction (FP); Decanter (D1) where solids are separated by centrifugation; Air (A): organic waste (R); Separation tanks (TN1), TN(i), where (i) represents the number of washing stages where washing takes place with acidified water. Protein concentrates (S11, S12, S13); FS+RP recycled (E11, E12, E13); FS eliminated from each cycle (L11, L12, L13).

Organic industrial wastes will thus pass the first pre-treatment process that is depicted in FIG. 1.

The wastes (R) will be treated in an acidified flotation-sedimentation process (TES), pH 4–5.5 (in the range of 20/1 to 10/1 volume/dry weight of the residue), that will permit the washout of the undesired substances in the product to be solubilised and which could contaminate the final peptones.

The waste is homogenised in this acidified aqueous medium and is allowed to decant.

In said process the low density insoluble fibre (FLC) is separated from the insoluble high-density protein pellets and is eliminated by mechanical means from the surface of the separation tank. Finally, the aqueous part (FS) is eliminated since it essentially contains sugars and alkaloids, by means of decanters (D1).

This same process is repeated with the insoluble protein fraction (FP), as there still remain residues of undesired substances, the number of repetitions (TN(i)) will depend on the nature of the waste. Thereby, in sunflower filter-cake after the fifth wash, the chemical analyses reveal the absence of sugars and/or alkaloids in the acidified waters. It is in this phase where most of the polyphenols are eliminated, which are the major alkaloids, especially in sunflower seed. At the pH 5 of the acidulated water, polyphenols exhibit a lower degree of interaction with proteins, and are washed out during the washes. After the fifth wash their presence in the acidified rinse waters is very low.

In this way, an industrial organic waste is obtained which is in optimal conditions to be solubilised and have its proteins extracted enzymatically.

2) Direct solubilisation phase of the insoluble proteins of the protein concentrate, free of polyphenols, soluble sugars and insoluble fibre.

This extraction process will be carried out in an enzymatic reactor (1) under controlled pH and temperature. The hydrolytic solubilisation reaction shall be carried out by an endoprotease. Any endoprotease present in the market can be used.

During the reaction, the substrate will undergo a very remarkable physical change. At the beginning there are two well differentiated physical phases, one solid and one liquid, but throughout the development of the reaction, the solid phase gradually disappears due to the enzymatic extraction.

When the extraction finishes a liquid paste is obtained that is clarified by centrifugation and/or filtration, yielding, on the one hand, a precipitate (solid paste P.S.) formed by residues of the insoluble substrate: starches, insoluble fibres and part of the undigested protein, and on the other hand a liquid (liquid phase) of dark appearance, composed by proteins, peptides and amino acids, which is the peptone (P).

The peptones are filtered and are subsequently evaporated and concentrated until the powdered peptone is obtained.

The solid phase or paste is used in animal nutrition.

The obtained results attain a 25–40% degree of hydrolysis depending on the temperature and selected endoprotease, and a 60% to 80% solubilisation of the original protein now present in the form of peptone, versus the 35% which is attained with other alternative processes such as that described in WO98/23170.

Figure 2:
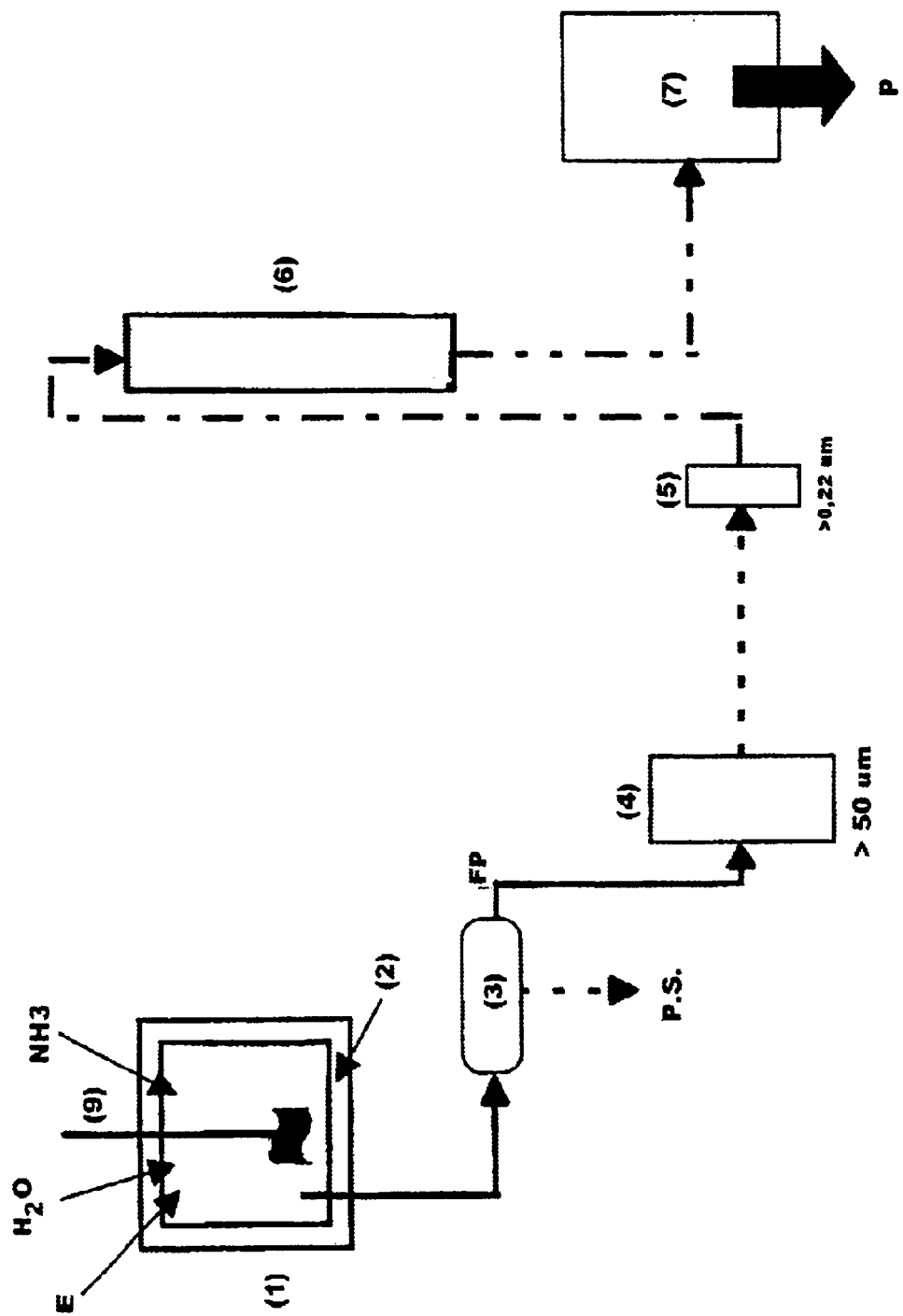
FIG. 2: Endoprotease enzymes (E); Enzymatic reactor (1); Thermal chamber (2); Ultracentrifuge (3): Filter system (4–5); Evaporator/Concentrator (6): Atomizer (7); Solid paste (PS); Stirrer (9); Peptones (P).

A scheme of the process is shown in FIG. 2.

Any endoprotease present in the market can be used, as the proteins to be solubilised present in the waste are very susceptible to being hydrolysed due to the treatments suffered by the raw materials from which said wastes originate, during the industrial processes where they are used: high temperatures, treatments with solvents, etc.

The choice of the enzyme/s to be used will depend on their cost, availability, etc. Regarding the range of reaction temperatures, operation will be at a range of ±10° C. of the temperature at which each enzyme has its maximum activity with respect to the substrate to hydrolyse.

What is claimed is:

1. A continuous direct protein solubilisation process of industrial waste of plant origin comprising:

a) A first phase of successive washings of the waste with acidified water, at a pH range of 4–5.5, to wash out alkaloids including polyphenols, sugars and fibres, followed, in a continuous process by:

b) A second phase of enzymatic reaction with endoproteases which attain a degree of hydrolysis which ranges from 25–40%, until obtaining, on one side, a liquid phase constituted essentially by solubilised peptones, at a concentration that ranges between 60–80% of the insoluble starting protein and which, subsequently, is filtered, sterilised, evaporated and concentrated to a powder, by conventional means, and on the other side, a solid phase constituted mostly by non-solubilised proteins, starches and insoluble sugars.

2. The process according to claim 1, wherein the wastes of plant origin are degreased filter-cakes of seeds, oleaginous plants including sunflower, rape or soy.

3. The process according to claim 1, wherein the wastes of plant origin consist of degreased filter-cakes of cotton or maize seeds.

4. The process according to claim 1, wherein the wastes of plant origin come from raw materials used in industrial fermentations, including the production of bioalcohol or those specific of the beer industry, and which comprise barley, maize, wheat or rice.

5. A process of feeding the solid phase obtained in the second phase (b) of claim 1, to animals including grass-eating animals.

* * * * *